（12）United States Patent
Mishra et al.

(10) Patent No.: US 12,513,050 B2
(45) Date of Patent: Dec. 30, 2025

(54) METHODS AND SYSTEMS FOR DYNAMIC RECOVERY WITH ADAPTIVE LATENCY INJECTION

(71) Applicant: Box, Inc., Redwood City, CA (US)

(72) Inventors: Advait Kumar Mishra, Mountain View, CA (US); Kirill Minkovich, Redwood City, CA (US); Luis Miguel Hernanz Iglesias, Sunnyvale, CA (US); Vova Galchenko, San Diego, CA (US); Mark W. Storer, Redwood City, CA (US); Girish Thattil, Foster City, CA (US)

(73) Assignee: Box, Inc., Redwood City, CA (US)

( * ) Notice: Subject to any disclaimer, the term of this patent is extended or adjusted under 35 U.S.C. 154(b) by 232 days.

(21) Appl. No.: 18/203,884

(22) Filed: May 31, 2023

(65) Prior Publication Data
US 2024/0022478 A1   Jan. 18, 2024

Related U.S. Application Data

(60) Provisional application No. 63/388,488, filed on Jul. 12, 2022.

(51) Int. Cl.
*H04L 43/0876* (2022.01)
*H04L 41/0896* (2022.01)
*H04L 43/0852* (2022.01)

(52) U.S. Cl.
CPC ...... *H04L 41/0896* (2013.01); *H04L 43/0852* (2013.01); *H04L 43/0876* (2013.01)

(58) Field of Classification Search
None
See application file for complete search history.

(56) References Cited

U.S. PATENT DOCUMENTS

| | | | |
|---|---|---|---|
| 8,533,103 B1 * | 9/2013 | Certain | G06Q 30/06 705/37 |
| 11,416,362 B2 * | 8/2022 | White | G06F 11/0751 |
| 2012/0060169 A1 * | 3/2012 | Steffens | G06F 13/161 718/104 |
| 2014/0075005 A1 * | 3/2014 | Tung | G06F 11/3006 709/223 |

(Continued)

*Primary Examiner* — Christopher B Robinson
(74) *Attorney, Agent, or Firm* — Sheridan Ross P.C.

(57) ABSTRACT

Embodiments of the disclosure provide systems and methods for reducing the capacity used to provide High Availability (HA) and Disaster Recovery (DR) in a distributed computing environment. According to one embodiment, dynamic recovery of a cloud-based resource can comprise setting a current latency value to an initial latency value and handling received requests with the current latency value. Current resource utilization can be detected while requests are being processed and a determination can be made as to whether the detected current resource utilization exceeds a predetermined threshold amount of resource utilization. In response to determining the detected current resource utilization does not exceed the threshold, the current latency amount can be maintained at the initial latency value. In response to determining the detected current resource utilization exceeds the threshold, the current latency value can be adjusted and injected into handling of received client requests.

20 Claims, 5 Drawing Sheets

(56) References Cited

U.S. PATENT DOCUMENTS

| | | | |
|---|---|---|---|
| 2014/0229608 A1* | 8/2014 | Bauer | G06F 11/3452 |
| | | | 709/224 |
| 2014/0304437 A1* | 10/2014 | Ashok | G06F 3/0613 |
| | | | 710/18 |
| 2017/0083247 A1* | 3/2017 | Ashok | G06F 15/17 |
| 2020/0257581 A1* | 8/2020 | Darwin | G06F 11/0793 |
| 2021/0255902 A1* | 8/2021 | Soon-Shiong | G06F 9/5027 |

* cited by examiner

METHODS AND SYSTEMS FOR DYNAMIC RECOVERY WITH ADAPTIVE LATENCY INJECTION

CROSS REFERENCE TO RELATED APPLICATION

The present application claims the benefits of and priority, under 35 U.S.C. § 119(e), to U.S. Provisional Application No. 63/388,488 filed Jul. 12, 2022 by Mishra, et. al. and entitled "Methods and Systems for Dynamic Recovery with Adaptive Latency Injection" of which the entire disclosure is incorporated herein by reference for all purposes.

FIELD OF THE DISCLOSURE

Embodiments of the present disclosure relate generally to methods and systems for managing a distributed system and more particularly to reducing the capacity used to provide high-availability and disaster recovery in a distributed system while being non-disruptive and without failing requests.

BACKGROUND

The traditional approach for ensuring resource availability in case of errors in a distributed computing environment is to have redundancy between an active portion of the environment and a backup portion for the environment which replicates the active portion. In the active environment, this can be done by deploying copies of the applications and data in different availability zones that are supposed to be isolated and they do not share components so that they cannot fail at the same time. For Disaster Recovery (DR), an additional environment is used with a production footprint close to the one of the active environment without the additional capacity needed for High Availability (HA). Since disasters are rare, DR resources are idle for the most part of their lifespan.

In a traditional environment design, either on-prem or cloud-based, with three availability zones, for example, the standard capacity model is 2.5N, with N being the theoretical capacity needed to process traffic at peak in a normal, i.e., non-error, situation. 1.5N of that capacity can be installed in the active site as it is evenly spread across the three availability zones. In case one availability zone fails, the other two still have enough capacity to serve all the production traffic. The additional 1N can be used by the DR environment. Therefore, there is a 150% overhead over the theoretical capacity that would be used without any protection for errors. Any mechanism that could reduce that overhead would translate into significant cost savings. Large-scale distributed systems consume computational resources in proportion to the traffic they serve. Hence the problem of reducing the needed capacity drills down to reducing traffic.

There are several traditional approaches of achieving this including client-side rate-limiting, server-side throttling, and server-side load shedding. All these are disruptive, i.e they fail the requests and cause clients to retry. Also, these can impact the availability Service Level Agreement (SLA) of the system. Embodiments of the present disclosure are directed to.

Hence, there is a need for improved methods and systems for reducing the capacity used to provide HA and DR while being non-disruptive and without failing requests.

BRIEF SUMMARY

Embodiments of the disclosure provide systems and methods for reducing the capacity used to provide High Availability (HA) and Disaster Recovery (DR) in a distributed computing environment while being non-disruptive and without failing requests. According to one embodiment, a method for dynamic recovery of a cloud-based resource can comprise setting a current latency value to an initial latency value and handling received requests with the current latency value. Current resource utilization can be detected while requests are being processed and a determination can be made as to whether the detected current resource utilization exceeds a predetermined threshold amount of resource utilization. In response to determining the detected current resource utilization does not exceed the predetermined threshold amount of resource utilization, the current latency amount can be maintained at the initial latency value. In response to determining the detected current resource utilization exceeds the predetermined threshold amount of resource utilization, the current latency value can be adjusted and injected into handling of received client requests.

Adjusting the current latency value can comprise identifying a context for a received request, determining a latency increment value and a maximum latency value for the identified context for the received request and incrementing the current latency value by the latency increment value for the identified request type for up to the maximum latency value for the identified context for the received request. For example, identifying the context for the received request can comprise determining whether the received request is from a client device with an interactive user or a client device with a non-interactive user. Additionally, or alternatively, identifying the context for the received request can comprise determining whether the received request is from a client device with a paid user or a client device with a non-paid user. In such cases, and in response to determining the received request is from a client device with a paid user, a tier of a plurality of tiers can be determined for the paid user. Identifying the context for the received request can additionally, or alternatively, comprise determining a request type for the received request. Additionally, or alternatively, identifying the context for the received request can comprise determining a level of traffic for the distributed cloud-based storage system.

According to another embodiment, a system can comprise a processor and a memory coupled with and readable by the processor. The memory can store therein a set of instructions which, when executed by the processor, causes the processor to set a current latency value to an initial latency value, handle received requests with the current latency value, detect current resource utilization while requests are being processed, and determine whether the detected current resource utilization exceeds a predetermined threshold amount of resource utilization. In response to determining the detected current resource utilization does not exceed the predetermined threshold amount of resource utilization, the instructions can cause the processor to maintain the current latency amount at the initial latency value. In response to determining the detected current resource utilization exceeds the predetermined threshold amount of resource utilization, the instructions can cause the processor to adjust the current latency value and inject the adjusted current latency value into handling of received client requests.

Adjusting the current latency value can comprise identifying a context for a received request, determining a latency increment value and a maximum latency value for the identified context for the received request and incrementing the current latency value by the latency increment value for the identified request type for up to the maximum latency value for the identified context for the received request. For example, identifying the context for the received request can comprise determining whether the received request is from a client device with an interactive user or a client device with a non-interactive user. Additionally, or alternatively, identifying the context for the received request can comprise determining whether the received request is from a client device with a paid user or a client device with a non-paid user. In such cases, and in response to determining the received request is from a client device with a paid user, a tier of a plurality of tiers can be determined for the paid user. Identifying the context for the received request can additionally, or alternatively, comprise determining a request type for the received request. Additionally, or alternatively, identifying the context for the received request can comprise determining a level of traffic for the distributed cloud-based storage system.

According to yet another embodiment, a non-transitory, computer-readable medium can comprise a set of instructions stored therein which, when executed by a processor, causes the processor to set a current latency value to an initial latency value, handle received requests with the current latency value, detect current resource utilization while requests are being processed, and determine whether the detected current resource utilization exceeds a predetermined threshold amount of resource utilization. In response to determining the detected current resource utilization does not exceed the predetermined threshold amount of resource utilization, the instructions can cause the processor to maintain the current latency amount at the initial latency value. In response to determining the detected current resource utilization exceeds the predetermined threshold amount of resource utilization, the instructions can cause the processor to adjust the current latency value and inject the adjusted current latency value into handling of received client requests.

Adjusting the current latency value can comprise identifying a context for a received request, determining a latency increment value and a maximum latency value for the identified context for the received request and incrementing the current latency value by the latency increment value for the identified request type for up to the maximum latency value for the identified context for the received request. For example, identifying the context for the received request can comprise determining whether the received request is from a client device with an interactive user or a client device with a non-interactive user. Additionally, or alternatively, identifying the context for the received request can comprise determining whether the received request is from a client device with a paid user or a client device with a non-paid user. Identifying the context for the received request can additionally, or alternatively, comprise determining a request type for the received request. Additionally, or alternatively, identifying the context for the received request can comprise determining a level of traffic for the distributed cloud-based storage system.

Figure 1:
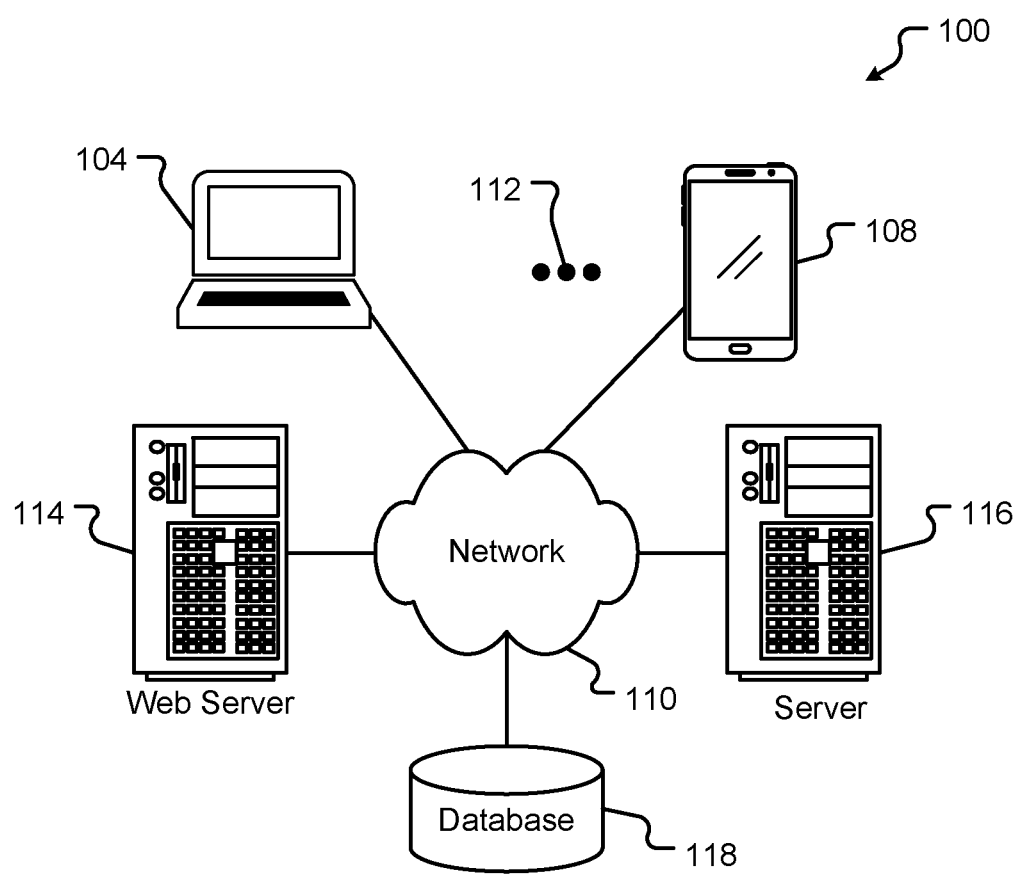
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
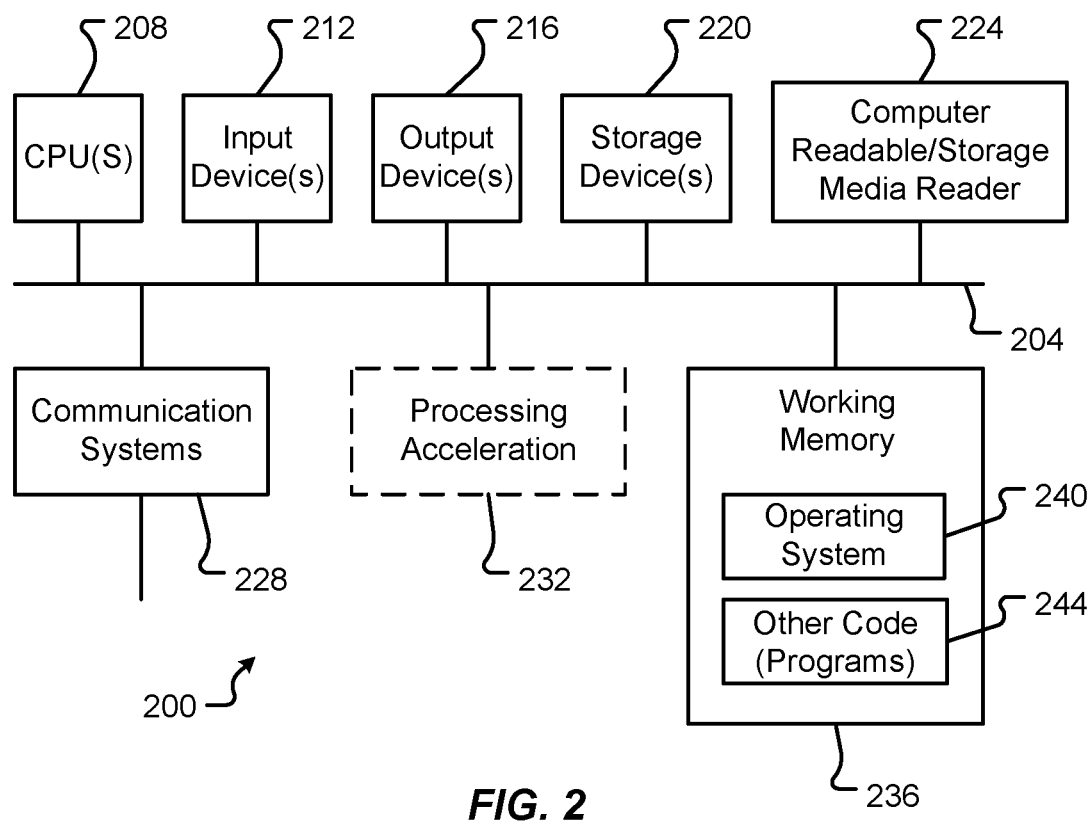
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Embodiments of the present disclosure are directed to providing High-Availability (HA) and Disaster Recovery (DR) of a cloud-based resource. For example, embodiments of the present disclosure are thought to be particularly useful in environments providing cloud-based storage and other environments in which high-availability is a priority. Large scale distributed systems typically utilize redundant capacity to handle degraded capacity situations and provide high availability. In such systems, some capacity can be utilized as an active or production site while additional capacity can be utilized as backup to which the active site can failover to in the event of a failure that decreases available capacity. Normally, if a system has such an active/DR model, the backup or DR environment has an equivalent capacity to the production environment to cover the case of a full failure of it. This redundant capacity has a significant cost to the operator of the system. Embodiments of the present disclosure are directed to reducing these capacity buffers, without impacting the overall availability of the system during a degraded capacity situation.

Figure 3:
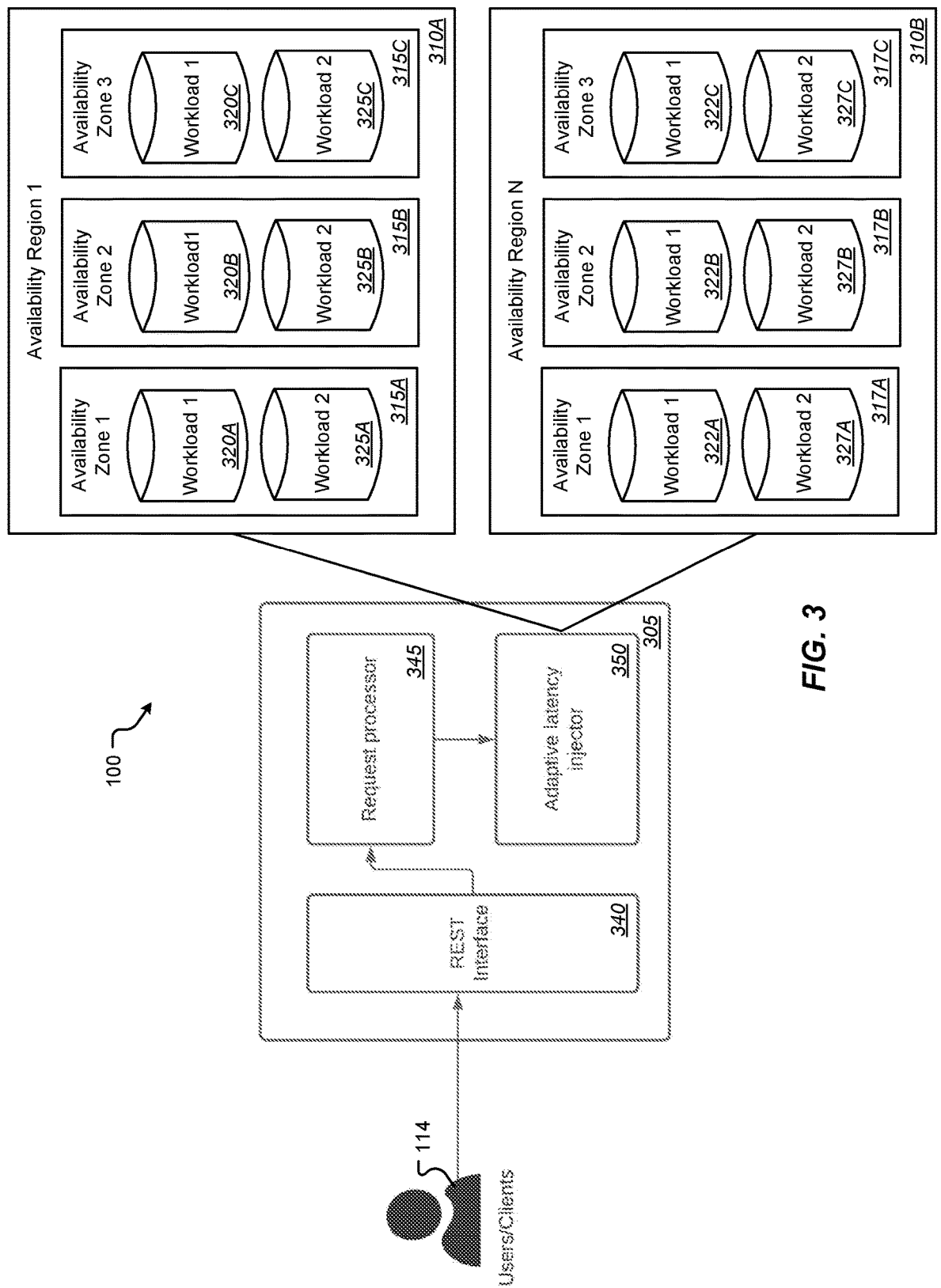
FIG. 3 is a block diagram illustrating exemplary elements of an environment for implementing dynamic recovery with adaptive latency injection according to one embodiment of the present disclosure.

FIG. 3 is a block diagram illustrating exemplary elements of an environment for implementing dynamic recovery with adaptive latency injection according to one embodiment of the present disclosure. More specifically, this example illustrates a distributed, cloud-based environment 300 in which one or more servers 305 can provide to any number of users 310 access to cloud-based storage. The servers 305 can also provide any number of cloud-based services related to the storage. For example, these services can include, but are not limited to, providing online, cloud-based backup and storage of client data, providing a cloud-based collaboration environment in which users can access the data stored in the environment, etc. The storage can be distributed geographically in different availability regions 310A and 310B, for example, in order to provide HA and DR during disaster situations. The storage within each availability region 310A and 310B may further be divided into a plurality of availability zones 315A-315C and 317A-317C with each availably zone comprising storage 320A-320C, 325A-325C, 322A-322C, and 327A-327C, e.g., a set of active storage 320A-C and 322A-322C and a set of back-up storage 325A-325C and 327C-327C. Failures of active storage 320A, an entire availability zone 315A, or even an availability region 310A can be caused by a man-made change where an erroneous code/configuration gets rolled out, a hardware failure in the environment, or a natural calamity which brings down a full environment.

According to one embodiment, HA and DR can be achieved by dynamically introducing or injecting an adaptive amount of latency to handling of client requests. That is, when a partial failure of the active system 320 is detected, the server(s) 305 can inject a period of latency between receiving a request from a client device and responding to that request. In this way, the requests can be handled without failure but while also utilizing a lower overall amount of capacity. More specifically, when a request is received at the server(s) 305 from a user device 310 through an interface such as a Representational State Transfer (REST) interface 340, for example, the request can be processed by a request processor 345 of the server(s) 305 but an adaptive latency injector 350 of the server(s) can pause or wait before passing the request of resulting process(es) to the active storage 330 systems. The latency can be adaptive in that it can vary in the amount of time or even whether it is applied to any particular request based on any of a variety of factors including, but not limited to, the client and/or type of client making the request, any SLA or similar considerations the client and/or type of client may have, i.e., a policy for the client or type of client, the type of request made, e.g., upload of a new file vs. read of an existing file or edit of an existing file, current load or activity on the system overall, a learned model for applying adaptive latency, etc.

In this way, embodiments of the present disclosure help reduce the required computational footprint of a distributed system by reducing the overall throughput of the system by dynamically injecting context dependent latencies. According to one embodiment, different latencies can be introduced in different parts of the system. The different latencies can depend on, for example, the type of operation that the client is executing. The increase in latencies can result in clients automatically backing off which in turn leads to reduction in traffic. That is, in the case of interactive clients, e.g., a human user making requests such as browsing a website, the increase in latency leads customers to context switch into doing something else, which leads to backoff while automated clients, e.g., requests coming from a computer program which uses client libraries to interact with the system, are programmed to backoff with increase in latency. This approach does not impact any availability SLA as it is not failing/dropping the request but rather delaying the processing of the request.

Figure 4:
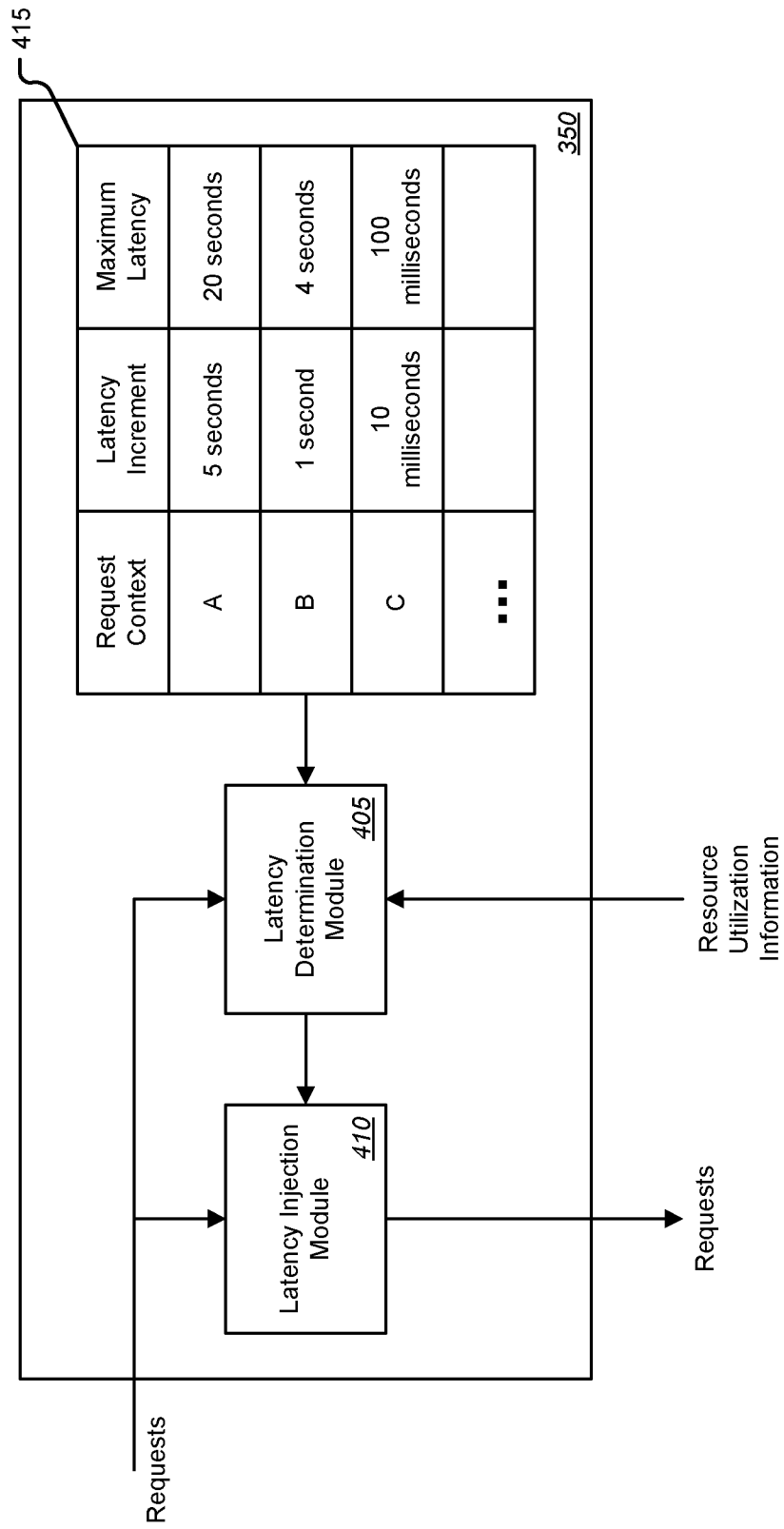
FIG. 4 is a block diagram illustrating additional details of an exemplary adaptive latency injector according to one embodiment of the present disclosure.

FIG. 4 is a block diagram illustrating additional details of an exemplary adaptive latency injector according to one embodiment of the present disclosure. As illustrated in this example, the adaptive latency injector 350 can include a latency determination module 405 and a latency injection module 410. Generally speaking, the latency determination module 405 can receive client requests and determine a context for the request. The context can be based on one or more characteristics of the request as will be described below. The latency determination module 405 may also receive resource utilization information from the server(s) 305 and/or storage systems 315A and 315B. From this resource utilization information, the latency determination module 405 can determine whether latency should be introduced. If so, the latency determination module 405 can determine, based on the context of the request, a latency increment, i.e., how much latency should be increased at one time, and a maximum latency, i.e., a maximum total amount of latency accumulated. According to one embodiment, these determinations can be made based on a table 415 storing predefined values for the latency increment and maximum latency for each of any number of different contexts for received messages. Once the latency has been determined, the latency injection module 410 can introduce that amount of delay or latency before passing the client request to the active storage.

The context of the requests can be determined based on a number of different factors and/or characteristics of the requests. For example, determining the context can include determining whether the request is interactive, i.e., made based on action of a human user, or non-interactive, i.e., made by an automated client such as an agent or application executed by a computer. More latency can be added to requests from automated clients than interactive requests. These can be further categorized. For example, some interactive requests may be more sensitive to latency than others, such as website browsing as opposed to file downloading. As a result, the latter can accommodate more latency than the former. Similarly, non-interactive requests made be some automated clients might be more sensitive to latency than others, such as a customer app processing financial transactions as opposed to a customer app creating backups. The latter can therefore tolerate more latency than the former. Thus, the context of the request can further include or be based on the type and/or sub-type of the request. In another example, requests that require a lot of compute resources can have more latency added than those that do not. The context of the request may also be determined based on whether the request is made from a paid or free user. Context can additionally, or alternatively, be based on different tiers of paid customers, i.e., added latency can be differentiated based on the tier of the paid customer.

Embodiments of the present disclosure can handle situations where an Availability Zone (AZ) 315A in an active region 310A is down, whether it is due to planned maintenance or an unanticipated outage, or partially failed, i.e., degraded. In such scenarios, the adaptive latency injector 350 can take action to dynamically reduce the incoming traffic throughput by introducing latency into the system. This can allow the system to continue serving traffic out of the remaining AZs 315B and 315C in the active region 310A, thus maintaining the service despite the interruption in one of the availability zones. This means that the system can handle unexpected outages and maintain the service in a more efficient way by redirecting traffic to available resources.

Similarly, embodiments of the present disclosure can handle situations where the entire active region 310A is down, whether it is due to planned maintenance or an unanticipated outage. In such scenarios, the adaptive latency injector 350 can take action to dynamically reduce the incoming traffic throughput by introducing latency into the system. This can allow the system to continue serving traffic out of a disaster recovery (DR) region with a smaller infrastructure footprint. This means that the system is able to handle unexpected outages and maintain the service in a more efficient way by reducing unnecessary resource usage.

Embodiments of the present disclosure can help manage customer traffic patterns by smoothing out the peaks and troughs that typically occur throughout the day. For example, customer traffic may roughly follow a sine curve, with the highest levels of traffic during working hours and the lowest levels during non-working hours. This means that businesses often have to provision infrastructure to meet the demands of traffic at peak times, even though a majority of that infrastructure is not needed during off-peak hours. Embodiments of the present disclosure can address this by reducing the amount of provisioned capacity needed during peak hours. This can be achieved by adding latency to certain types of traffic during peak and non-peak hours. For example, assume that overall traffic can be categorized into two categories, A and B, with both A and B types of traffic roughly following a sine curve. That is both traffic types can have peak traffic during working hours and trough traffic during non-working hours. In such a case, and assuming that traffic type B is less sensitive to latency than traffic type A, the adaptive latency injector 350 could add latency to traffic type B during peak hours and to traffic type A during non-peak hours. This can reduce the throughput of traffic type B during peak hours and traffic type A during non-peak hours, which can help to even out the traffic sine curve and ultimately reduce the amount of provisioned capacity needed. Embodiments of the present disclosure can also be integrated with automatic scaling of resources. In such cases, latency can be introduced not to reduce capacity but rather to wait for additional capacity to be provisioned.

Embodiments of the present disclosure can address the issue of clients/users who misuse the system by exceeding their traffic quotas and disregarding suggested throttling policies. These users can cause disruptions to the system and negatively impact the experience of other users. Embodiments of the present disclosure can deal with this problem by adding latency to the requests made by these abusive users. This can be a more effective way to throttle the requests and limit the impact on the system. It can also help in maintaining the stability of the service and protecting the rights of the other legitimate users.

Embodiments of the present disclosure can address the issue of client-side errors, e.g., errors which are indicated by HTTP response codes 4XX. These errors occur when requests are bad, forbidden, or unauthenticated, and are typically caused by an erroneous code on the client end. These errors can cause disruptions to the system and negatively impact the experience of other users. Embodiments of the present disclosure can deal with this problem by adding latencies to the requests which have client-side errors. This can help in maintaining the stability of the service and protecting the rights of the other legitimate users.

In some cases, such an interactive request like a web browsing session, latency may be added to customer requests which are made over a user interface (UI). In such cases, and according to one embodiment, content can be provided during the time of delay caused by the introduced latency. For example, content comprising advertisements, entertainment, "how-tos" or other educational content, etc. can be presented to the user through the UI. Content can comprise any one or more of text, images, short video and/or audio clips, etc.

Figure 5:
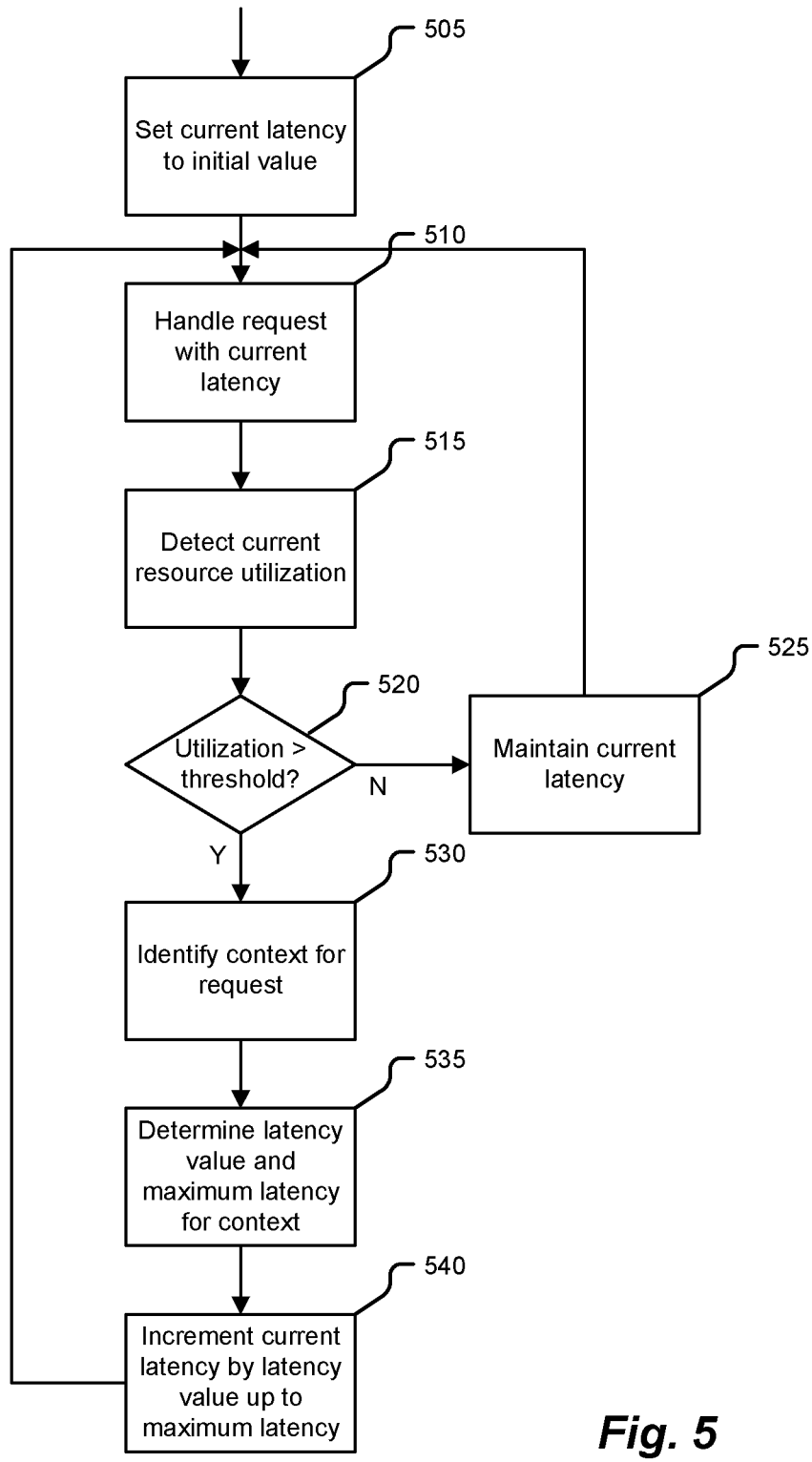
FIG. 5 is a flowchart illustrating an exemplary process for dynamic recovery with adaptive latency injection according to one embodiment of the present disclosure.

FIG. 5 is a flowchart illustrating an exemplary process for dynamic recovery with adaptive latency injection according to one embodiment of the present disclosure. As illustrated in this example, the process can begin with setting 505 a current latency value to an initial latency value. For example, the initial value may be 0 for no added latency. Received requests can then be handled 510 with the current latency value. Current resource utilization can be detected 515 while requests are being processed and a determination 520 can be made as to whether the detected 515 current resource utilization exceeds a predetermined threshold amount of resource utilization. In response to determining 520 the detected current resource utilization does not exceed the predetermined threshold amount of resource utilization, the current latency amount can be maintained 525, e.g., at the initial latency value. In response to determining 520 the detected current resource utilization exceeds the predetermined threshold amount of resource utilization, the current latency value can be adjusted and injected into handling of received client requests.

Adjusting the current latency value can comprise identifying 530 a context for a received request, determining 535 a latency increment value and a maximum latency value for the identified context for the received request, incrementing 540 the current latency value by the latency increment value for the identified request type for up to the maximum latency value for the identified context for the received request, and handling 510 requests with the adjusted current latency. For example, identifying 530 the context for the received request can comprise determining whether the received request is from a client device with an interactive user or a client device with a non-interactive user. Additionally, or alternatively, identifying 530 the context for the received request can comprise determining whether the received request is from a client device with a paid user or a client device with a non-paid user. In such cases, and in response to determining the received request is from a client device with a paid user, a tier of a plurality of tiers can be determined for the paid user. Identifying 530 the context for the received request can additionally, or alternatively, comprise determining a request type for the received request. Additionally, or alternatively, identifying 530 the context for the received request can comprise determining a level of traffic for the distributed cloud-based storage system.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for dynamic recovery of a cloud-based resource, the method comprising:
   setting, by a processor of a distributed cloud-based storage system, a current latency value to an initial latency value;
   handling, by the processor of a distributed cloud-based storage system, received requests with the current latency value;
   detected, by the processor of a distributed cloud-based storage system, current resource utilization while requests are being processed;
   determining, by the processor of a distributed cloud-based storage system, whether the detected current resource utilization exceeds a predetermined threshold amount of resource utilization;
   in response to determining the detected current resource utilization does not exceed the predetermined threshold amount of resource utilization, maintaining, by the processor of a distributed cloud-based storage system, the current latency amount at the initial latency value; and
   in response to determining the detected current resource utilization exceeds the predetermined threshold amount of resource utilization, adjusting, by the processor of a distributed cloud-based storage system, the current latency value and injecting the adjusted current latency value into handling of received client requests, wherein injecting the adjusted current latency value into handling of received requests introduces a period of latency equal to the adjusted current latency value into the handling of the received requests.

2. The method of claim 1, wherein adjusting the current latency value comprises:
   identifying a context for a received request;
   determining a latency increment value and a maximum latency value for the identified context for the received request; and
   incrementing the current latency value by the latency increment value for the identified request type for up to the maximum latency value for the identified context for the received request.

3. The method of claim 2, wherein identifying the context for the received request comprises determining whether the received request is from a client device with an interactive user or a client device with a non-interactive user.

4. The method of claim 2, wherein identifying the context for the received request comprises determining whether the received request is from a client device with a paid user or a client device with a non-paid user.

5. The method of claim 4, wherein identifying the context for the received request comprises, in response to determining the received request is from a client device with a paid user, determining a tier of a plurality of tiers for the paid user.

6. The method of claim 2, wherein identifying the context for the received request comprises determining a request type for the received request.

7. The method of claim 2, wherein identifying the context for the received request comprises determining a level of traffic for the distributed cloud-based storage system.

8. A system comprising:
   a processor; and
   a memory coupled with and readable by the processor and storing therein a set of instructions which, when executed by the processor, causes the processor to:
   set a current latency value to an initial latency value;
   handle received requests with the current latency value;
   detect current resource utilization while requests are being processed;
   determine whether the detected current resource utilization exceeds a predetermined threshold amount of resource utilization;
   in response to determining the detected current resource utilization does not exceed the predetermined threshold amount of resource utilization, maintain the current latency amount at the initial latency value; and
   in response to determining the detected current resource utilization exceeds the predetermined threshold amount of resource utilization, adjust the current latency value and inject the adjusted current latency value into handling of received client requests, wherein injecting the adjusted current latency value into handling of received requests introduces a period of latency equal to the adjusted current latency value into the handling of the received requests.

9. The system of claim 8, wherein adjusting the current latency value comprises:
   identifying a context for a received request;
   determining a latency increment value and a maximum latency value for the identified context of the received request; and
   incrementing the current latency value by the latency increment value for the identified context for the received request for up to the maximum latency value for the identified context for the received request.

10. The system of claim 8, wherein identifying the context for the received request comprises determining whether the received request is from a client device with an interactive user or a client device with a non-interactive user.

11. The system of claim 8, wherein identifying the context for the received request comprises determining whether the received request is from a client device with a paid user or a client device with a non-paid user.

12. The system of claim 11, wherein identifying the context for the received request comprises, in response to determining the received request is from a client device with a paid user, determining a tier of a plurality of tiers for the paid user.

13. The system of claim 8, wherein identifying the context for the received request comprises determining a request type for the received request.

14. The system of claim 8, wherein identifying the context for the received request comprises determining a level of traffic for the distributed cloud-based storage system.

15. A non-transitory, computer-readable medium comprising a set of instructions stored therein which, when executed by a processor, causes the processor to:
  set a current latency value to an initial latency value;
  handle received requests with the current latency value;
  detect current resource utilization while requests are being processed;
  determine whether the detected current resource utilization exceeds a predetermined threshold amount of resource utilization;
  in response to determining the detected current resource utilization does not exceed the predetermined threshold amount of resource utilization, maintain the current latency amount at the initial latency value; and
  in response to determining the detected current resource utilization exceeds the predetermined threshold amount of resource utilization, adjust the current latency value and inject the adjusted current latency value into handling of received client requests, wherein injecting the adjusted current latency value into handling of received requests introduces a period of latency equal to the adjusted current latency value into the handling of the received requests.

16. The non-transitory, computer-readable medium of claim 15, wherein adjusting the current latency value comprises:
  identifying a context for a received request;
  determining a latency increment value and a maximum latency value for the identified context for the received request; and
  incrementing the current latency value by the latency increment value for the identified context for the received request for up to the maximum latency value for the identified context for the received request.

17. The non-transitory, computer-readable medium of claim 16, wherein identifying the context for the received request comprises determining whether the received request is from a client device with an interactive user or a client device with a non-interactive user.

18. The non-transitory, computer-readable medium of claim 16, wherein identifying the context for the received request comprises determining whether the received request is from a client device with a paid user or a client device with a non-paid user.

19. The non-transitory, computer-readable medium of claim 16, wherein identifying the context for the received request comprises determining a request type for the received request.

20. The non-transitory, computer-readable medium of claim 16, wherein identifying the context for the received request comprises determining a level of traffic for the distributed cloud-based storage system.

* * * * *